(12) United States Patent
Bassett (10) Patent No.: US 9,934,413 B2
(45) Date of Patent: Apr. 3, 2018

(54) MAGNETIC READER IDENTIFICATION OF OBJECTS

(71) Applicant: Disney Enterprises, Inc., Burbank, CA (US)

(72) Inventor: Katherine M. Bassett, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/225,644

(22) Filed: Aug. 1, 2016

(65) Prior Publication Data

US 2018/0032763 A1    Feb. 1, 2018

(51) Int. Cl.
*G06K 7/08* (2006.01)

(52) U.S. Cl.
CPC .................... *G06K 7/087* (2013.01)

(58) Field of Classification Search
CPC ......... G06K 7/087; G06K 7/082; G06K 7/084
See application file for complete search history.

(56) References Cited

U.S. PATENT DOCUMENTS

2011/0298447 A1* 12/2011 Foletto ................ G01D 5/145
                                                    324/207.2
2014/0180615 A1*  6/2014 Simon .................. B60R 25/24
                                                        702/65

* cited by examiner

*Primary Examiner* — Kristy A Haupt
(74) *Attorney, Agent, or Firm* — Farjami & Farjami LLP

(57) ABSTRACT

A magnetic reader for identifying an object includes a hardware processor, a memory storing multiple magnetic field profiles, and a magnetic field detector. The hardware processor of the magnetic reader is configured to detect, using the magnetic field detector, a magnetic field produced by one or more elements incorporated into the object, and to measure, using the magnetic field detector, one or more characteristics of the magnetic field. The hardware processor of the magnetic reader is further configured to compare the one or more characteristics of the magnetic field to one or more of the multiple magnetic field profiles stored in the memory, and to identify the object based on the comparison.

20 Claims, 9 Drawing Sheets

MAGNETIC READER IDENTIFICATION OF OBJECTS

BACKGROUND

Portable devices designed for object identification have useful applications in a variety of settings. For example, such devices can be used by visitors to a museum, marketplace, or amusement park to independently identify items or attractions of interest. One conventional approach for enabling the unique identification of objects using a portable device is through the use of radio-frequency identification (RFID) technology.

Although reliable, the RFID reader needed to identify objects generating an electromagnetic RF signature can be relatively expensive, rendering RFID an impractical technology for many applications. Consequently, there is a need for a cost-effective solution enabling a user to independently and accurately identify objects of interest.

SUMMARY

There are provided magnetic readers and methods for their use in identifying objects, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
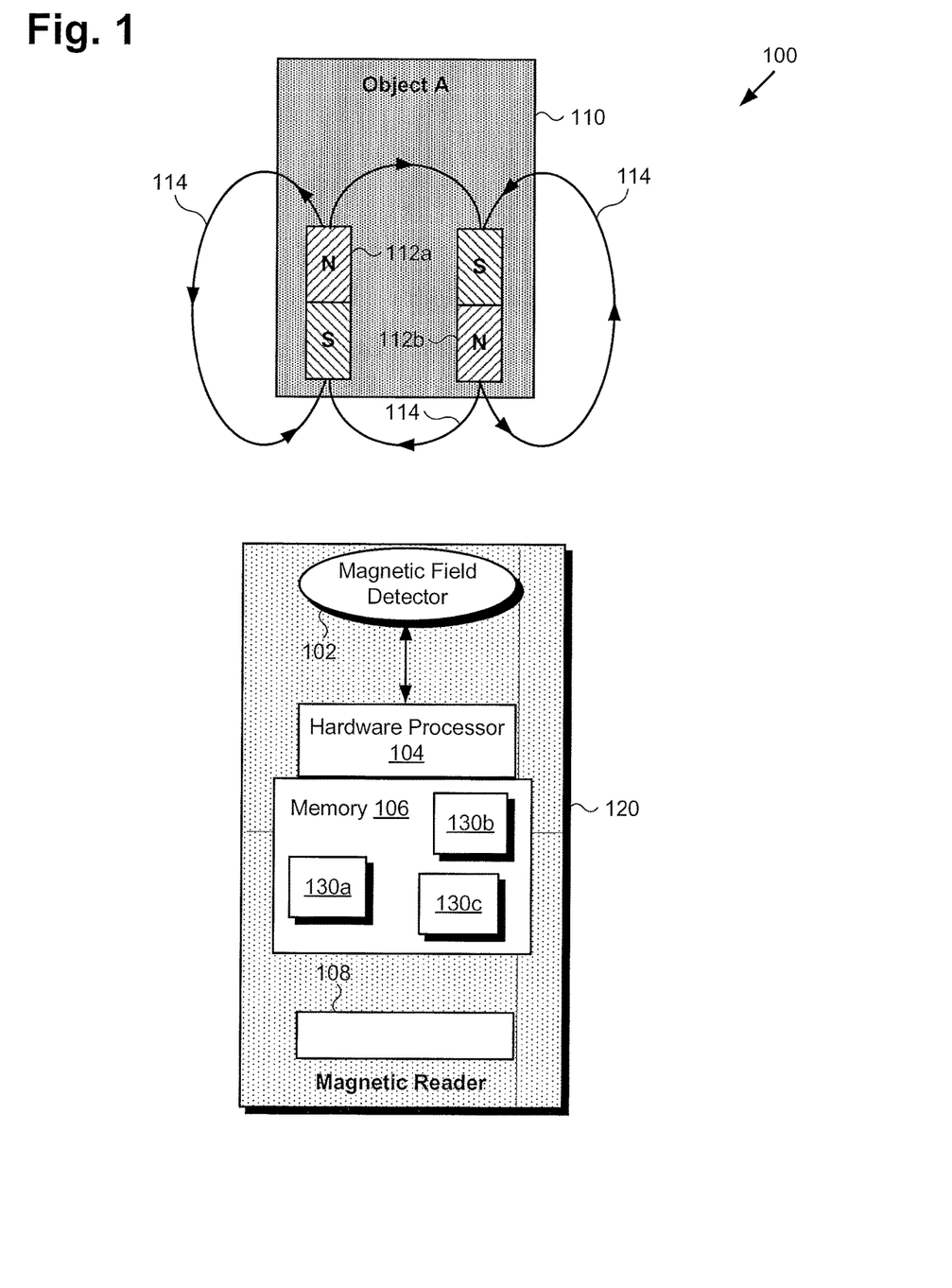
FIG. 1 shows a diagram of an exemplary magnetic reader and an object to be identified by the magnetic reader, according to one implementation.

FIG. 1 shows a diagram of an exemplary magnetic reader and an object to be identified by the magnetic reader, according to one implementation. As shown in FIG. 1, object identification environment 100 includes object 110, also "object A", and magnetic reader 120 configured to identify object 110 as object A. According to is the exemplary implementation shown by FIG. 1, elements 112a and 112b are incorporated into object 110. According to the present exemplary implementation, elements 112a and 112b are permanent magnets producing magnetic field 114. Magnetic field 114 may be detected and read by magnetic reader 120 to identify object 110.

Magnetic reader 120 includes hardware processor 104, and memory 106 implemented as a non-transitory storage device. Memory 106 is shown to store multiple magnetic field profiles 130a, 130b, and 130c (hereinafter "magnetic profiles 130a-130c"). As shown in FIG. 1, magnetic reader 120 also includes magnetic field detector 102, and may include optional display 108.

Magnetic field detector 102 may be implemented using one or more magnetometers. Thus, it is noted that although FIG. 1 depicts magnetic field detector 102 as a single integrated component of magnetic reader 120, magnetic field detector 102 is more generally representative of one or more components, such as one or more magnetometers, configured to measure a magnetic field. Optional display 108 may take the form of a liquid crystal display (LCD), a light-emitting diode (LED) display, an organic light-emitting diode (OLED) display, or another suitable display screen that performs a physical transformation of signals to light.

Figure 2:
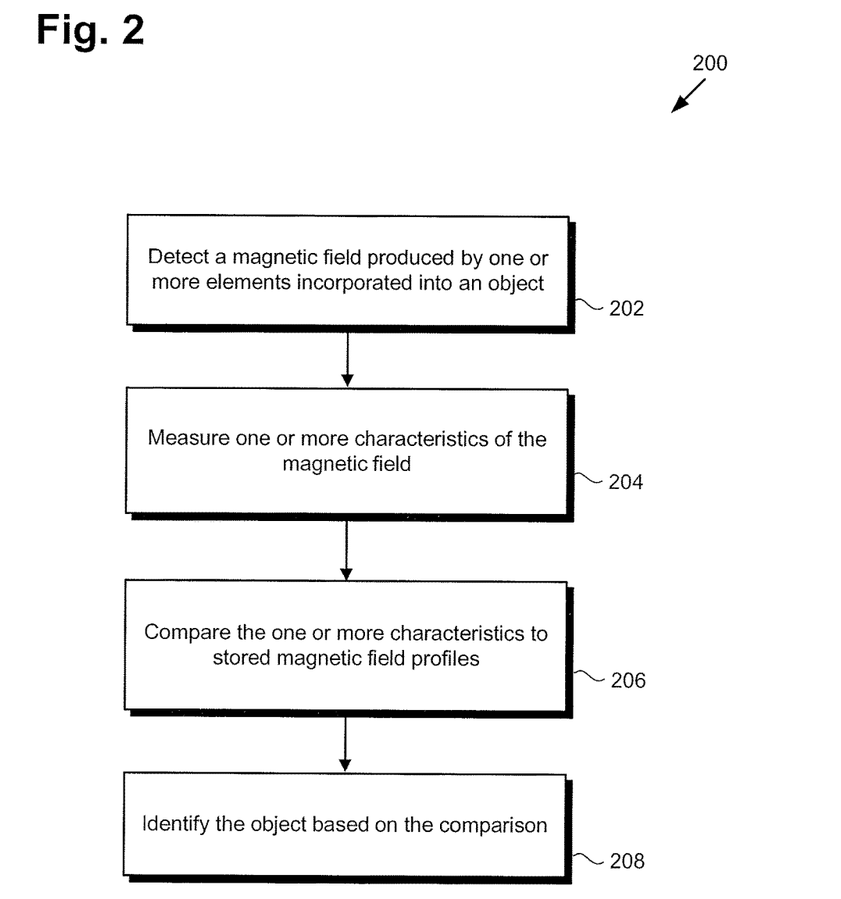
FIG. 2 shows a flowchart presenting an exemplary method for use by a magnetic reader to identify an object, according to one implementation.
Figure 3A:
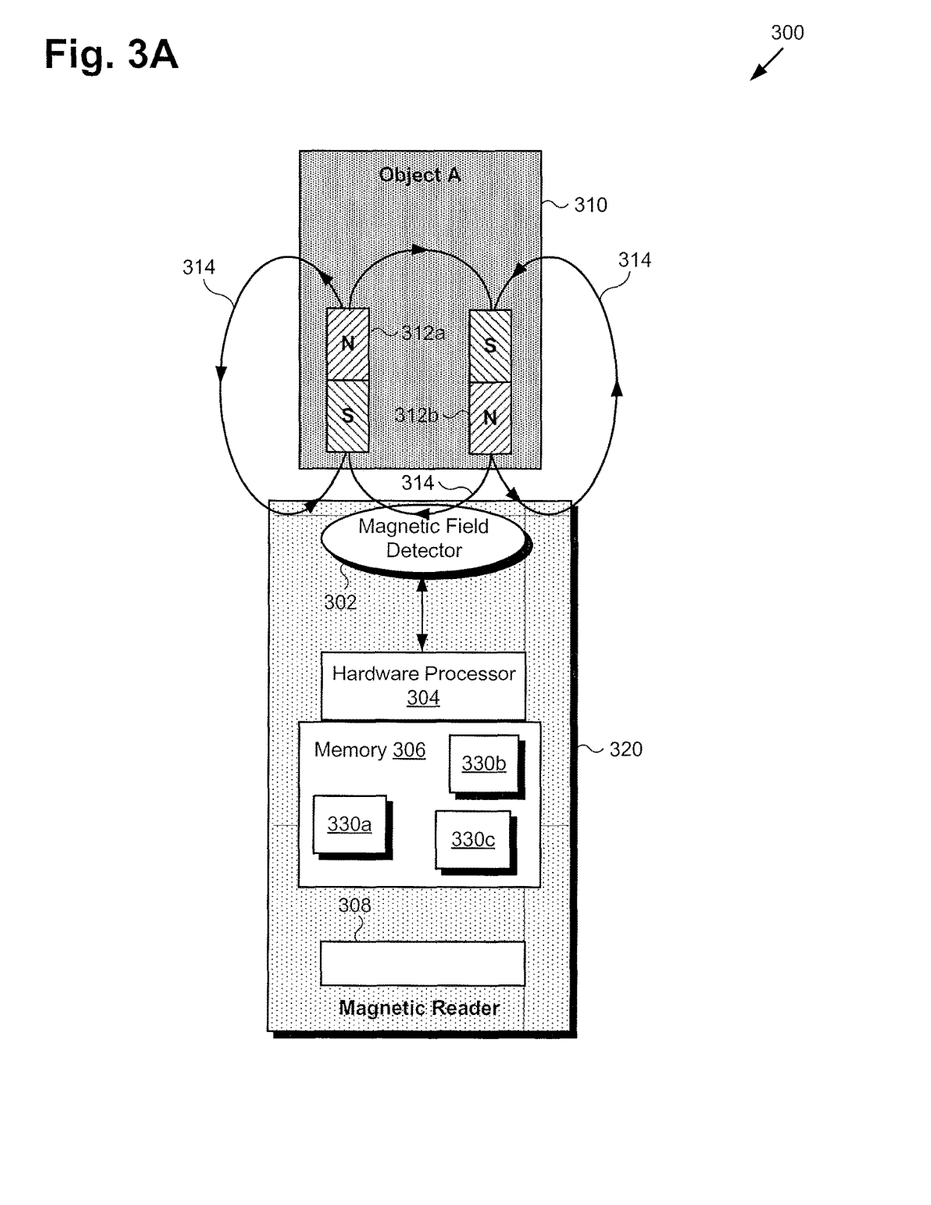
FIG. 3A shows a result of performing initial and intermediate actions according to the exemplary flowchart of FIG. 2, according to one implementation.
Figure 3B:
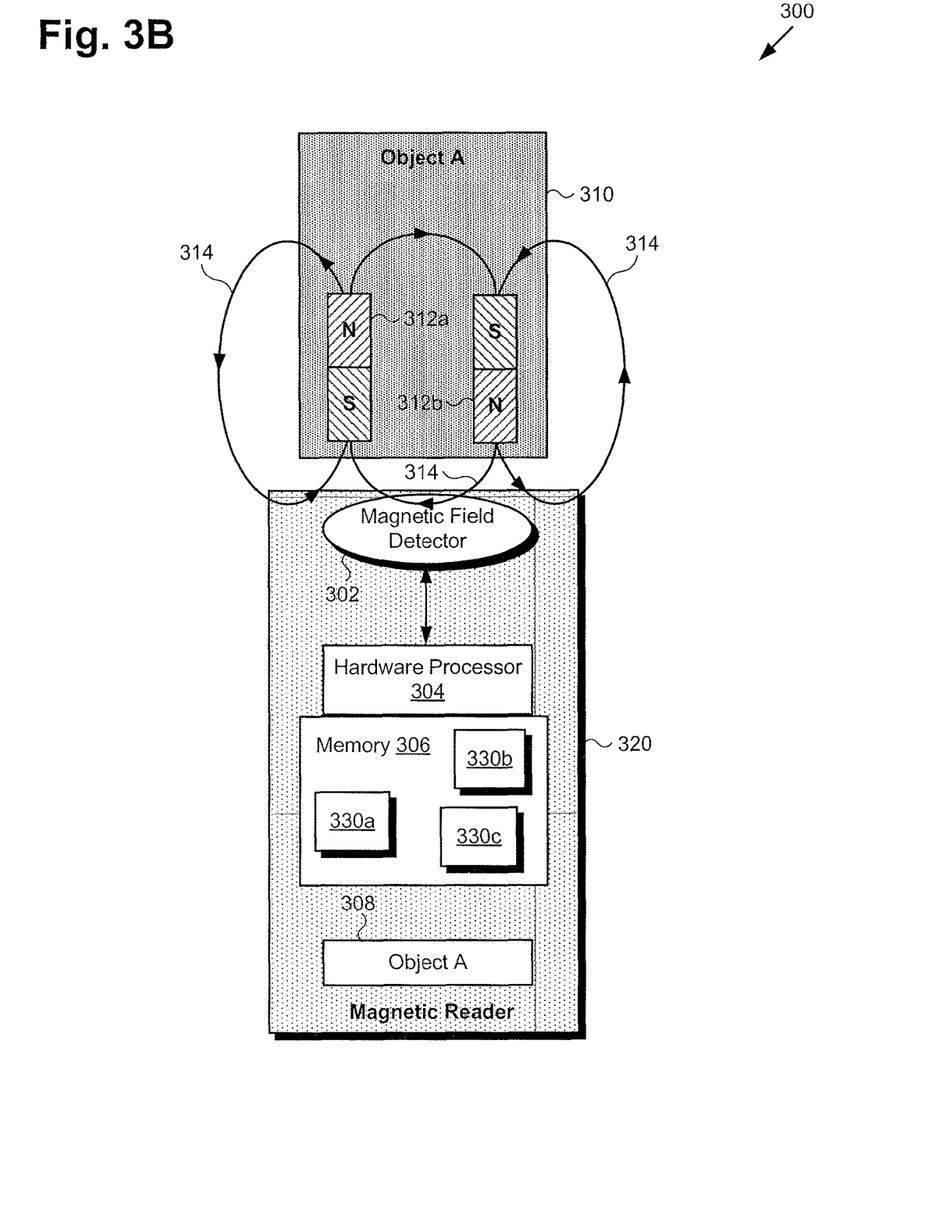
FIG. 3B shows a result of performing a final action according to the exemplary flowchart of FIG. 2, according to one implementation.
Figure 4:
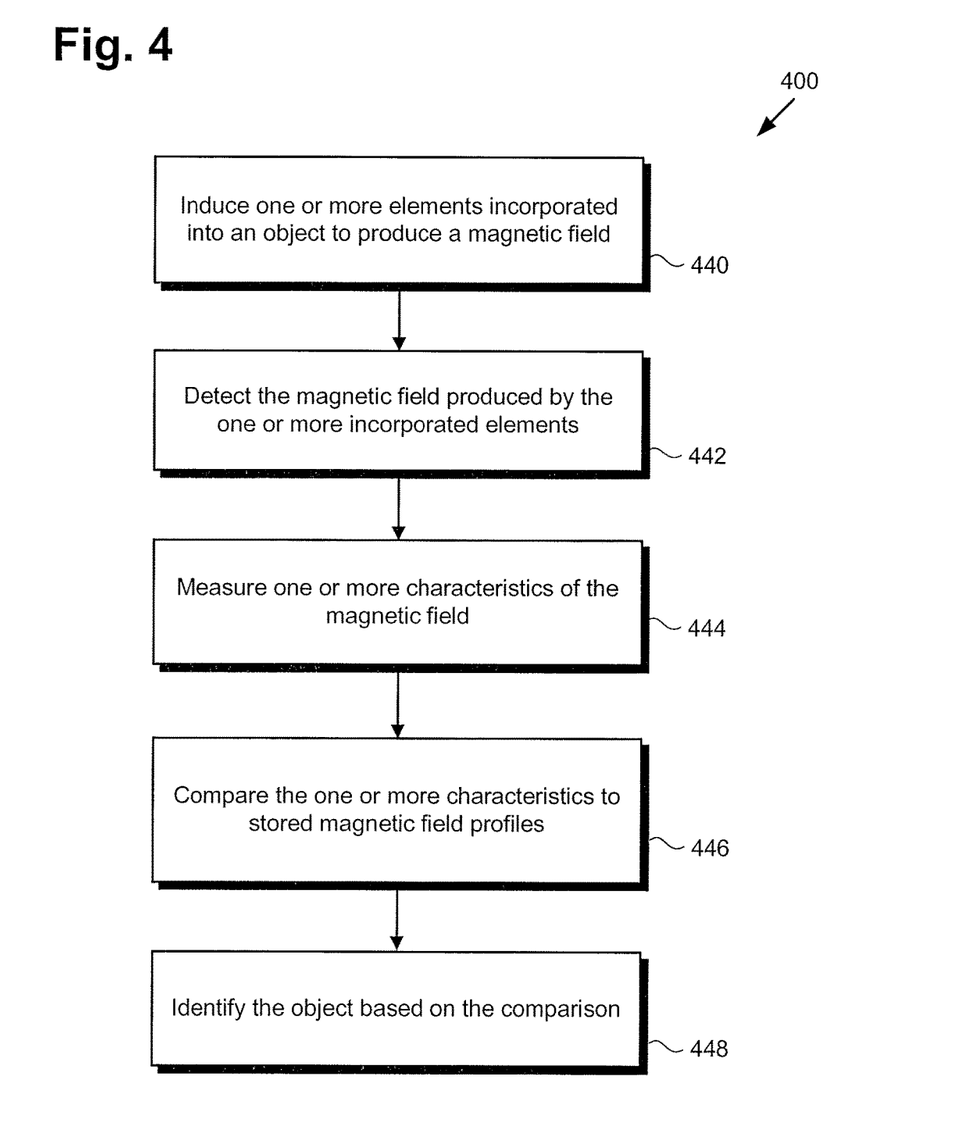
FIG. 4 shows a flowchart presenting an exemplary method for use by a magnetic reader to identify an object, according to another implementation.
Figure 5A:
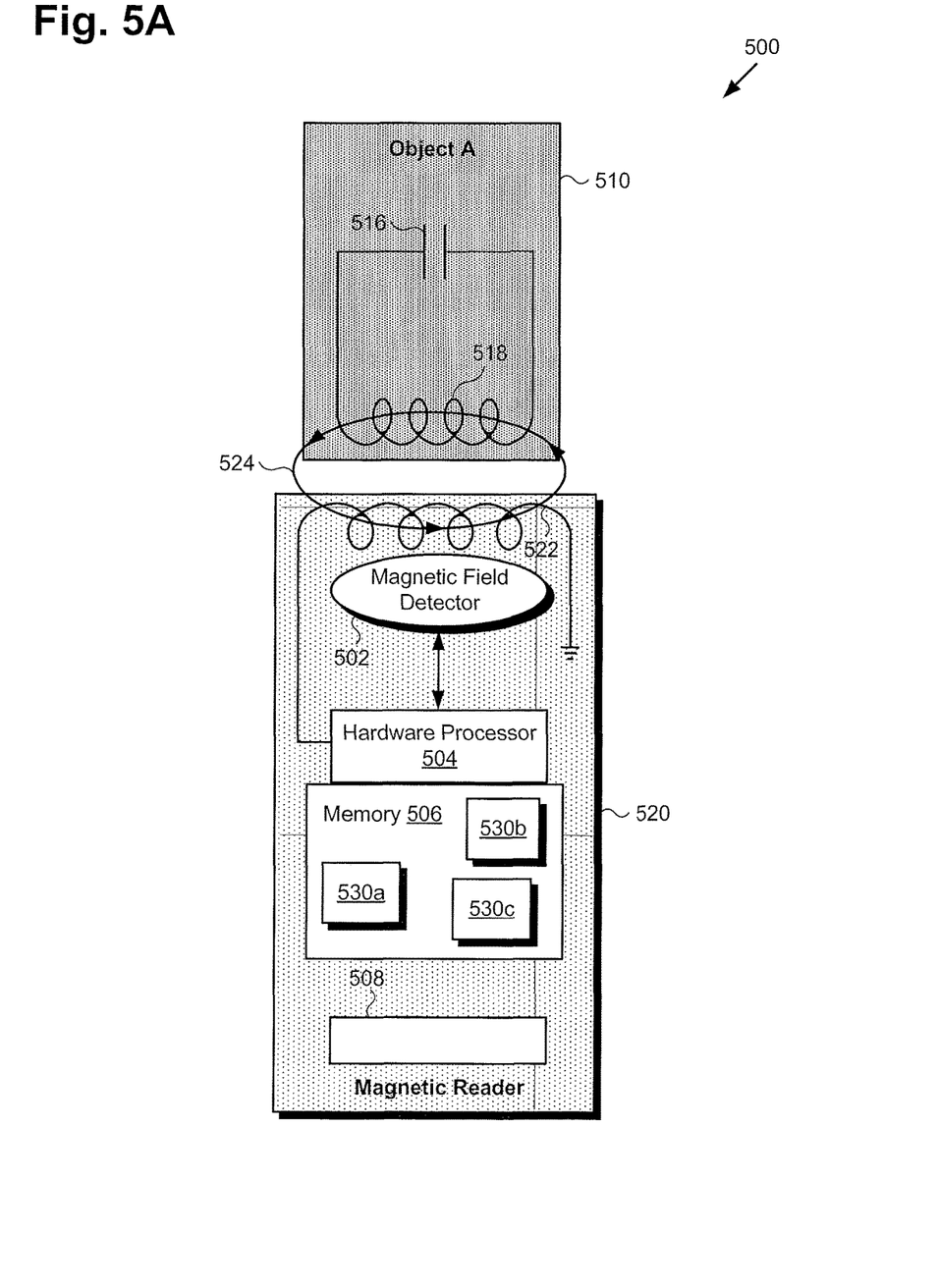
FIG. 5A shows a result of performing an initial action according to the exemplary flowchart of FIG. 4, according to one implementation.
Figure 5B:
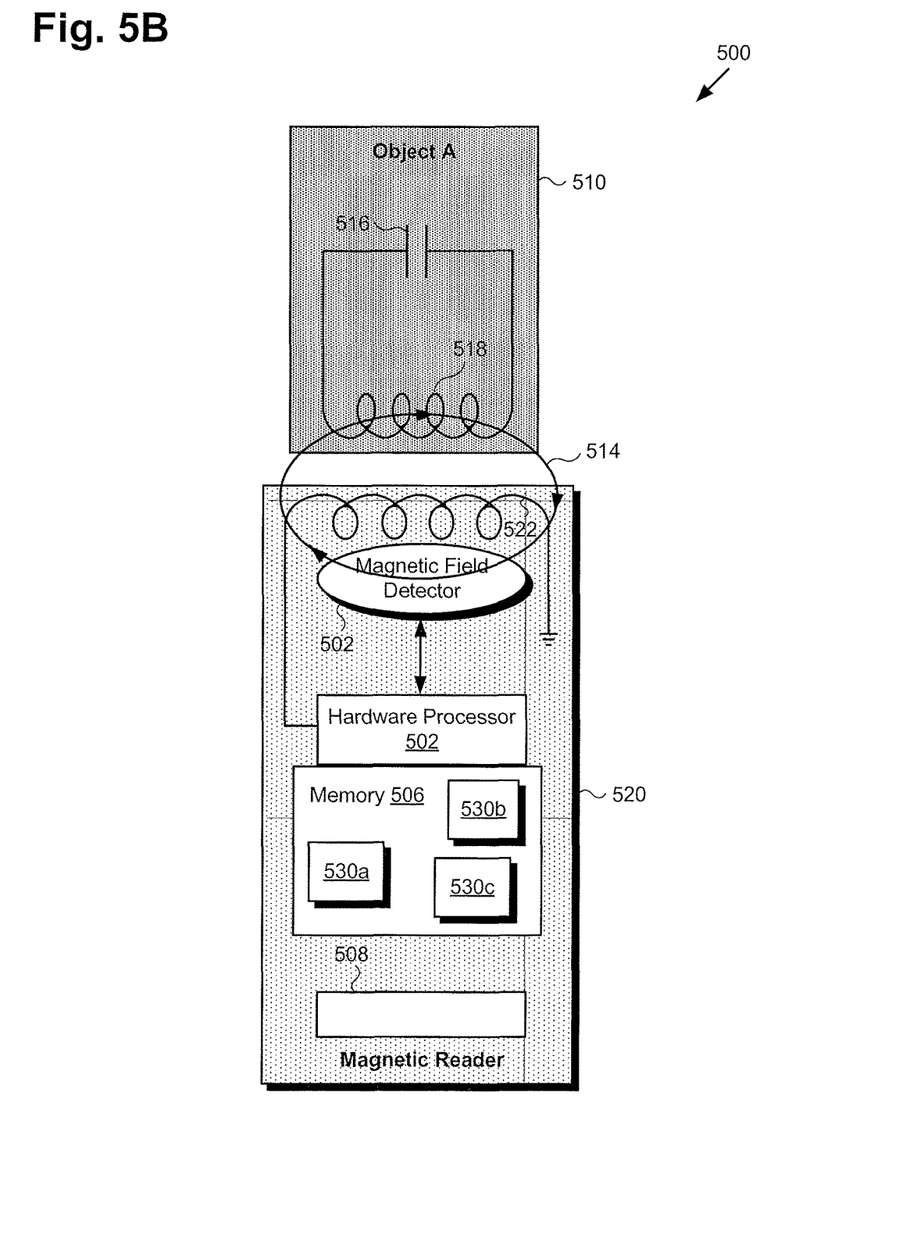
FIG. 5B shows a result of performing intermediate actions according to the exemplary flowchart of FIG. 4, according to one implementation.
Figure 5C:
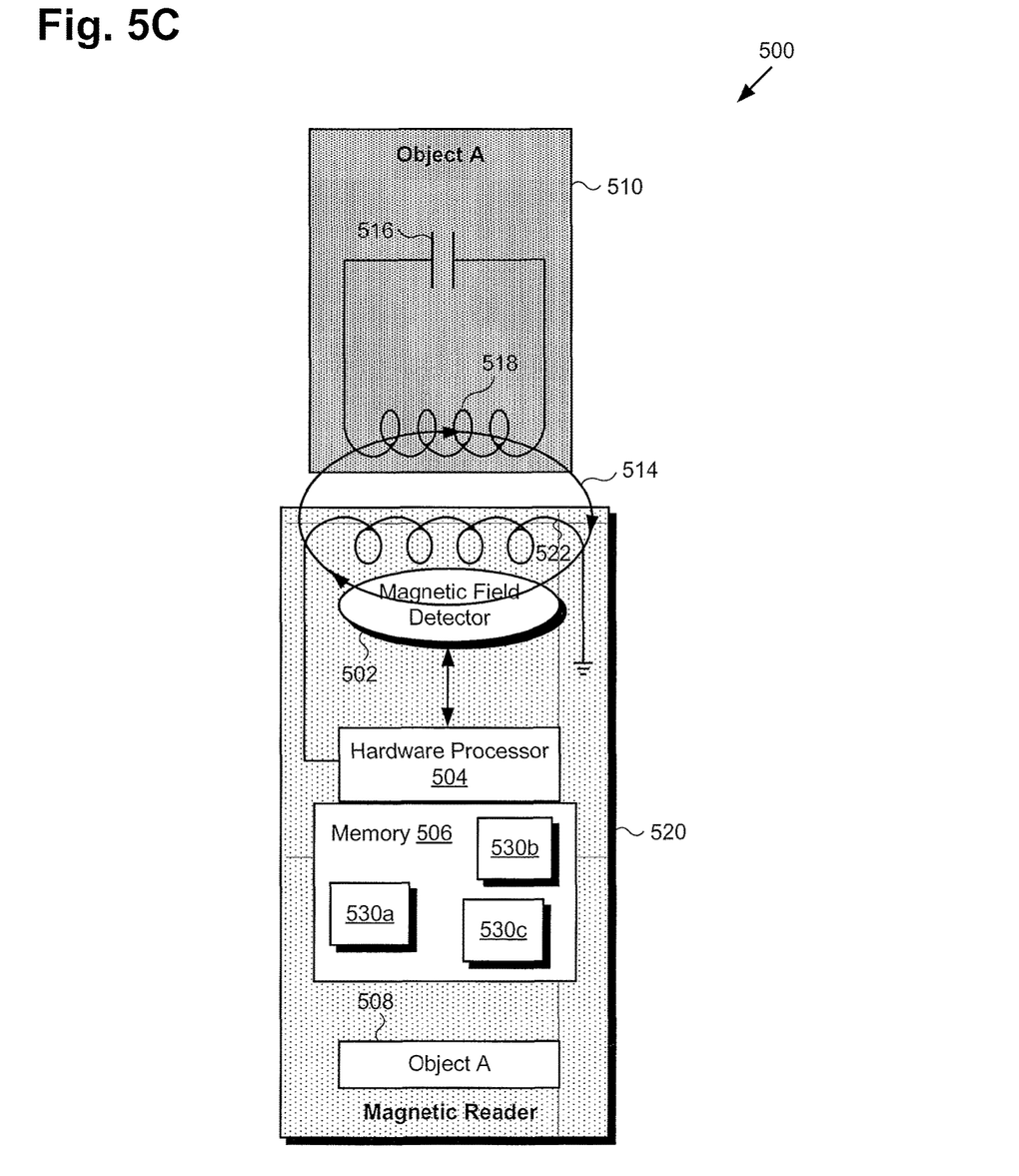
FIG. 5C shows a result of performing a final action according to the exemplary flowchart of FIG. 4, according to one implementation.
Figure 6:
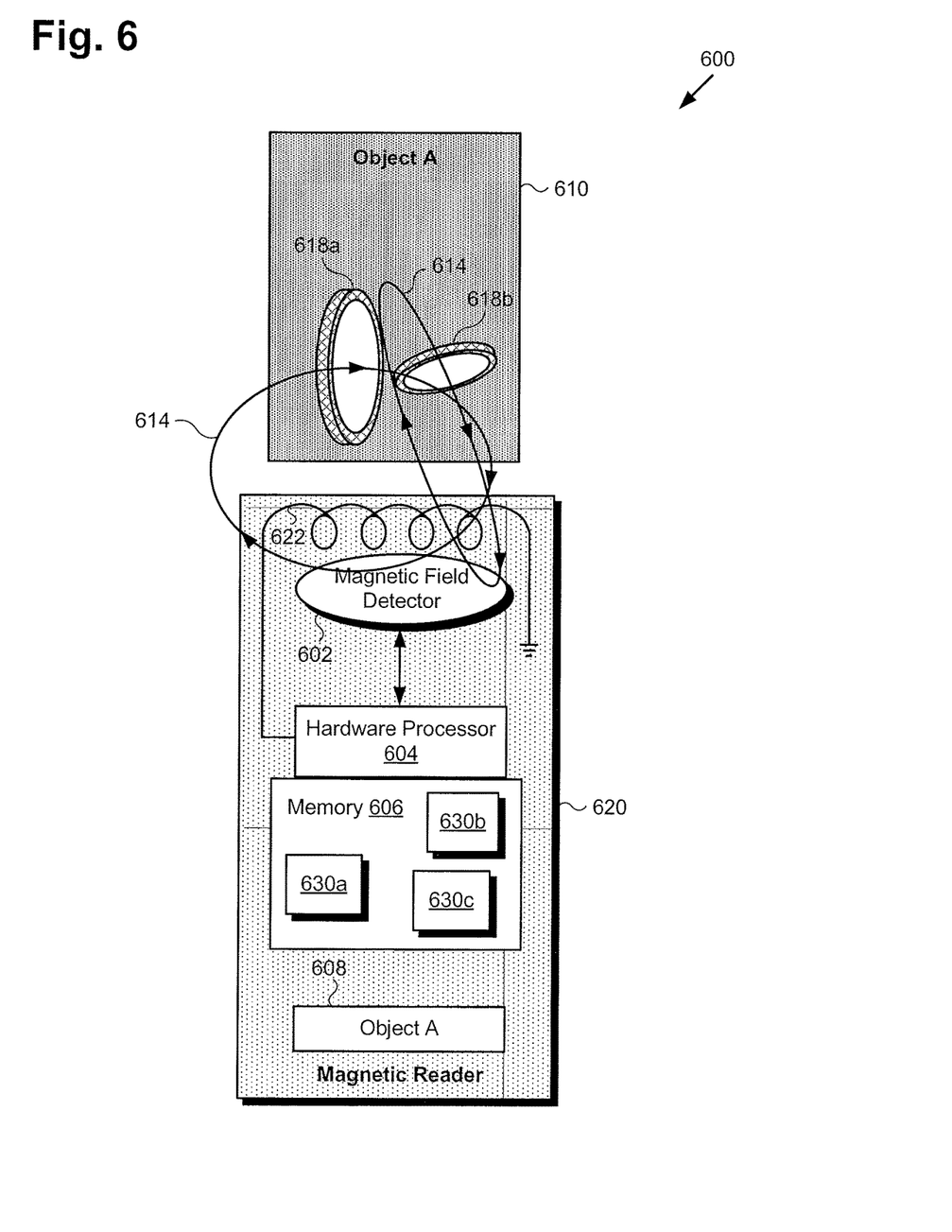
FIG. 6 shows a magnetic reader and an object identified by the magnetic reader, according to yet another implementation.

The identification of object 110 as object A by magnetic reader 120 will be further described with reference to FIG. 2 in combination with FIGS. 3A and 3B, and with reference to FIG. 4 in combination with FIGS. 5A, 5B, and 5C, as well as with reference to FIG. 6. FIG. 2 shows flowchart 200 presenting an exemplary method for use by a magnetic reader to identify an object, while FIGS. 3A and 3B depict performance of the actions outlined in Flowchart 200, according to one implementation. By analogy, FIG. 4 shows flowchart 400 presenting another exemplary method for use by a magnetic reader to identify an object, while FIGS. 5A, 5B, and 5C depict performance of the actions outlined in Flowchart 400, according to one implementation. FIG. 6 depicts the performance of the actions outlined in Flowchart 400, according to another implementation.

Referring to FIGS. 3A and 3B, FIGS. 3A and 3B show object identification environment 300 including object 310, also "object A", and magnetic reader 320 configured to identify object 310 as object A. As shown in FIGS. 3A and 3B, permanent magnet elements 312a and 312b are incorporated into object 310 and produce magnetic field 314. As further shown in FIGS. 3A and 3B, magnetic reader 320 includes hardware processor 304, memory 306 having magnetic field profiles 330a, 330b, and 330c (hereinafter "magnetic field profiles 330a-330c") stored therein, magnetic field detector 302, and optional display 308.

Magnetic reader 320 corresponds in general to magnetic reader 120, in FIG. 1. That is to say, hardware processor 304, memory 306, and magnetic field profiles 330a-330c, in FIGS. 3A and 3B, correspond respectively in general to hardware processor 104, memory 106, and magnetic field profiles 130a-130c, in FIG. 1, and may share any of the characteristics attributed to those corresponding features in the present application. In addition, magnetic field detector 302 and optional display 308 correspond respectively in general to magnetic field detector 102 and optional display 108, in FIG. 1, and may share any of the characteristics attributed to those corresponding features in the present application. Moreover, object 310 including elements 312a and 312b producing magnetic field 314 corresponds in general to object 110 including elements 112a and 112b producing magnetic field 114, in FIG. 1, and may share any of the characteristics attributed to that corresponding feature in the present application.

Referring now to FIG. 2 in combination with FIG. 3A, flowchart 200 begins with detecting magnetic field 314 produced by elements 312a and 312b incorporated into object 310 (action 202). Detection of magnetic field 314 may be performed by magnetic field detector 302 of magnetic reader 320, executed by hardware processor 304. As noted above, magnetic field detector 302 may be implemented as one or more magnetometers, for example, or any suitable detector configured to detect magnetic field 314, as well as to characterize and/or measure magnetic field 314.

According to the exemplary implementation shown in FIG. 3A, magnetic field 314 is a composite magnetic field resulting from the interaction of a magnetic field produced by permanent magnet element 312a with another magnetic field produce by permanent magnet element 312b. However, in another implementation, object 310 may include only one of permanent magnet elements 312a and 312b, and may thereby produce magnetic field 314 as a substantially dipole field. Moreover, in some implementations, object 310 may include additional incorporated elements contributing to the production of magnetic field 314. Those additional elements may include permanent magnets, capacitors, or induction coils, for example, and may contribute to the production of magnetic field 314 as a more complicated composite magnetic field.

Continuing to refer to FIG. 2 in combination with FIG. 3A, flowchart 200 continues with measuring one or more characteristics of magnetic field 314 (action 204). Measuring the one or more characteristics of magnetic field 314 may be performed by magnetic field detector 302 of magnetic reader 320, executed by hardware processor 304.

As noted above, magnetic field 314 may have a variety of shapes, depending on the number, type, size, and positioning of the elements incorporated into object 310. In addition, the field strength of magnetic field 314 may vary depending on the number, type, size, and positioning of the elements incorporated into object 310. As a result, the one or more characteristics of magnetic field 310 measured by magnetic reader 320 may include one or both of the field strength of magnetic field 314 and the shape of magnetic field 314.

Continuing to refer to FIG. 2 in combination with FIG. 3A, flowchart 200 continues with comparing the one or more characteristics of magnetic field 314 measured in action 204 to one or more of magnetic field profiles 330a-330c (action 206). Comparing the one or more characteristics of magnetic field 314 to one or more of magnetic field profiles 330a-330c may be performed by hardware processor 304, by accessing memory 306. It is noted that although FIGS. 3A and 3B show three is distinct magnetic field profiles 330a-330c, that representation is merely for conceptual clarity. More generally, the magnetic field profiles stored in memory 306 of magnetic reader 320 may include any number of magnetic field profiles, and may include three or many more.

Each of magnetic profiles 330a-330c stores one or more magnetic field characteristics, such as a magnetic field strength and/or magnetic field shape, as well as data uniquely identifying an object associated with the stored magnetic field characteristic or combination of characteristics. Hardware processor 304 may be configured to compare the one or more characteristics of magnetic field 314 measured in action 204 to each of magnetic field profiles 330a-330c until a match is found. Thus, hardware processor 304 may compare the one or more characteristics of magnetic field 314 measured in action 204 to one of magnetic field profiles 330a-330c, more than one but less than all of magnetic field profiles 330a-330c, or all of magnetic field profiles 330a-330c.

Referring to FIG. 2 in combination with FIG. 3B, flowchart 200 can conclude with identifying object 110 based on the comparison of magnetic field 314 to one or more of magnetic field profiles 330a-330c (action 208). Comparison of magnetic field 314 produced by elements 312a and 312b incorporated into object 310 to one or more of magnetic field profiles 330a-330c results in magnetic reader 320 identifying object 310 as object A. That identification of object 310 as object A may then be provided to a user of magnetic reader 320 on optional display 308, as shown in FIG. 3B.

Moving to FIGS. 5A, 5B, and 5C, FIGS. 5A, 5B, and 5C show object identification environment 500 including object 510, also "object A", and magnetic reader 520 configured to identify object 510 as object A, according to another exemplary implementation. As shown in FIGS. 5A, 5B, and 5C, capacitor element 516 and induction coil element 518 are incorporated into object 510. As further shown in FIGS. 5A, 5B, and 5C, magnetic reader 520 includes hardware processor 504, memory 506 having magnetic field profiles 530a, 530b, and 530c (hereinafter "magnetic field profiles 530a-530c") stored therein, magnetic field detector 502, magnetic coil 522, and optional display 508.

Magnetic reader 520 corresponds in general to magnetic reader 120/320, in FIG. 1/3A,3B. That is to say, hardware processor 504, memory 506, and magnetic field profiles 530a-530c, in FIGS. 5A, 5B, and 5C, correspond respectively in general to hardware processor 104/304, memory 106/306, and magnetic field profiles 130a-130c/330a-330c, in FIG. 1/3A,3B, and may share any of the characteristics attributed to those corresponding features in the present application. In addition, magnetic field detector 502 and optional display 508 correspond respectively in general to magnetic field detector 102/302 and optional display 108/308, in FIG. 1/3A,3B, and may share any of the characteristics attributed to those corresponding features in the present application.

Referring now to FIG. 4 in combination with FIGS. 5A and 5B, flowchart 400 begins inducing one or more elements incorporated into object 510 to produce a magnetic field (action 440). As shown in FIG. 5A, according to the present exemplary implementation, magnetic reader is configured to generate magnetic field 524. Magnetic field 524 may be generated by hardware processor 504 of magnetic reader 520, for example by pulsing or otherwise sending a current through magnetic coil 522.

It is noted that generation of magnetic field 524 may be a user activated feature of magnetic reader 520, or may be performed automatically by magnetic reader 520. In implementations in which generation of magnetic field 524 is performed automatically, that action may be performed periodically, based on a predetermined schedule, or based on proximity to object 510.

Magnetic field 524 generated using magnetic coil 522 induces a current through induction coil element 518 incorporated into object 510 that in turn charges capacitor element 516 incorporated into object 510. Referring to FIG. 5B, subsequent discharge of capacitor element 516 through induction coil element 518 produces induced magnetic field 514.

Continuing to refer to FIG. 4 in combination with FIG. 5B, flowchart 400 continues with detecting magnetic field 514 produced by capacitor element 516 and induction coil element 518 (action 442). Detection of magnetic field 514 may be performed by magnetic field detector 502 of magnetic reader 520, executed by hardware processor 504. As noted above, magnetic field detector 502 may be implemented as one or more magnetometers, for example, or any suitable detector configured to detect magnetic field 514, as well as to characterize and/or measure magnetic field 514.

According to the exemplary implementation shown in FIG. 5B, magnetic field 514 is produced using single capacitor element 516 and single induction coil element 518. However, in other implementations, object 510 may include additional incorporated elements contributing to the production of magnetic field 514. Those additional elements may include permanent magnets, capacitors, or induction coils, for example, and may contribute to the production of magnetic field 314 as a more complicated composite magnetic field.

Continuing to refer to FIG. 4 in combination with FIG. 5B, flowchart 400 continues with measuring one or more characteristics of magnetic field 514 (action 444). Measuring the one or more characteristics of magnetic field 514 may be performed by magnetic field detector 502 of magnetic reader 520, executed by hardware processor 504.

Magnetic field 514 may have a variety of shapes, depending on the number, type, size, and positioning of the elements incorporated into object 510. In addition, the field strength of magnetic field 314 may vary depending on the number, type, size, and positioning of the elements incorporated into object 510. Moreover, in implementations in which object 510 does not include incorporated permanent magnets or active circuitry for producing a magnetic field other than an induced magnetic field, magnetic field 514 will be a transient magnetic field characterized by a decay time.

The decay time of magnetic field 514 may correspond to the size or number of capacitor element or elements 516 incorporated into object 510. For example, capacitor element(s) 516 may be sized or otherwise configured to have a discharge time of less than or equal to approximately two seconds, with a corresponding decay time of magnetic field 514. Thus, the one or more characteristics of magnetic field 514 measured by magnetic reader 520 may include one or more of the field strength of magnetic field 514, the shape of magnetic field 514, and the decay time of magnetic field 514.

Continuing to refer to FIG. 4 in combination with FIG. 5B, flowchart 200 continues with comparing the one or more characteristics of magnetic field 514 measured in action 444 to one or more of magnetic field profiles 530a-530c (action 446). Comparing the one or more characteristics of magnetic field 514 to one or more of magnetic field profiles 530a-530c may be performed by hardware processor 504, by accessing memory 506. It is noted that although FIGS. 5A, 5B, and 5C show three distinct magnetic field profiles 530a-530c, that representation is merely for conceptual clarity. More generally, the magnetic field profiles stored in memory 506 of magnetic reader 520 may include any number of magnetic field profiles, and may include three or many more.

Each of magnetic profiles 530a-530c stores one or more magnetic field characteristics, such as a magnetic field strength and/or magnetic field shape and/or magnetic field decay time, as well as data uniquely identifying an object associated with the stored magnetic field characteristic or combination of characteristics. Hardware processor 504 may be configured to compare the one or more characteristics of magnetic field 514 measured in action 444 to each of magnetic field profiles 530a-530c until a match is found. Thus, hardware processor 504 may compare the one or more characteristics of magnetic field 514 measured in action 444 to one of magnetic field profiles 530a-530c, more than one but less than all of magnetic field profiles 530a-530c, or all of magnetic field profiles 530a-530c.

Referring to FIG. 4 in combination with FIG. 5C, flowchart 400 can conclude with identifying object 510 based on the comparison of magnetic field 514 to one or more of magnetic field profiles 530a-530c (action 448). Comparison of magnetic field 514 produced by capacitor element 516 and induction coil element 518 incorporated into object 510 to one or more of magnetic field profiles 530a-530c results in magnetic reader 520 identifying object 510 as object A. That identification of object 510 as object A may then be provided to a user of magnetic reader 520 on optional display 508, as shown in FIG. 5C.

Continuing to FIG. 6, FIG. 6 shows object identification environment 600 including magnetic reader 620 and object 610 identified by magnetic reader 620, according to yet another implementation. As shown in FIG. 6, multiple induction coil elements 618a and 618b having different respective sizes and orientations and are incorporated into object 610. As further shown in FIG. 6 magnetic reader 620 includes hardware processor 604, memory 606 having magnetic field profiles 630a, 630b, and 630c (hereinafter "magnetic field profiles 630a-630c") stored therein, magnetic field detector 602, magnetic coil 622, and optional display 508.

Magnetic reader 620 corresponds in general to magnetic reader 120/320/520, in FIG. 1/3A,3B/5A,5B,5C. That is to say, hardware processor 604, memory 606, and magnetic field profiles 630a-630c, in FIG. 6, correspond respectively in general to hardware processor 104/304/504, memory 106/306/506, and magnetic field profiles 130a-130c/330a-330c/530a-530c, in FIG. 1/3A,3B/5A,5B,5C, and may share any of the characteristics attributed to those corresponding features in the present application. In addition, magnetic field detector 602 and optional display 608 correspond respectively in general to magnetic field detector 102/302/502 and optional display 108/308/508, in FIG. 1/3A,3B/5A,5B,5C, and may share any of the characteristics attributed to those corresponding features in the present application. Furthermore, magnetic coil 622 of magnetic reader 620 corresponds in general to magnetic coil 522 of magnetic reader 520, in FIGS. 5A, 5B, and 5C and may share any of the characteristics attributed to that corresponding feature in the present application.

Magnetic field 614 is produced by induction coil elements 618a and 618b incorporated into object 610, and is induced by a magnetic generated by magnetic reader 620 (inducing magnetic field not shown in FIG. 6). Magnetic field 614 may have a variety of shapes, depending on the number, type, size, and orientation of induction coil elements 618a and 618b. In addition, the field strength of magnetic field 614 may vary depending on the number, type, size, and orientation of induction coil elements 618a and 618b.

Moreover, in implementations in which object 610 does not include incorporated permanent magnets or active circuitry for producing a magnetic field other than an induced magnetic field, magnetic field 614 will be a transient magnetic field characterized by a decay time. As a result, the one or more characteristics of magnetic field 614 measured by magnetic reader 620 may include one or more of the field strength of magnetic field 614, the shape of magnetic field 614, and the decay time of magnetic field 614.

Comparison of the one or more characteristics of magnetic field 614 produced by induction coil elements 618a and 618b and measured by magnetic reader 610 to one or more of magnetic field profiles 630a-630c results in magnetic reader 620 identifying object 610 as object A. As shown in FIG. 6, that identification of object 610 as object A may then be provided to a user of magnetic reader 620 on optional display 608.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A magnetic reader for identifying an object, the magnetic reader comprising:
   a hardware processor;
   a memory storing a plurality of magnetic field profiles having magnetic characteristics of a plurality of magnetic field producing elements designed for incorporation into a plurality of objects including the object; and
   a magnetic field detector;
   the hardware processor being configured to:
   detect, using the magnetic field detector, a first magnetic field produced by a first one of the plurality of magnetic field producing elements incorporated into the object;
   measure, using the magnetic field detector, one or more characteristics of the first magnetic field produced by the first one of the plurality of magnetic field producing elements;
   compare the one or more characteristics of the first magnetic field to one or more of the plurality of magnetic field profiles stored in the memory to match the first magnetic field with the magnetic characteristics of the first one of the plurality of magnetic field producing elements; and
   identify the object based on the comparison and matching the first magnetic field with the magnetic characteristics of the first one of the plurality of magnetic field producing elements.

2. The magnetic reader of claim 1, wherein the one or more characteristics of the first magnetic field comprise a field strength of the first magnetic field produced by the first one of the plurality of magnetic field producing elements incorporated into the object.

3. The magnetic reader of claim 1, wherein the one or more characteristics of the first magnetic field comprise a shape of the first magnetic field produced by the first one of the plurality of magnetic field producing elements incorporated into the object.

4. The magnetic reader of claim 1, wherein the hardware processor of the magnetic reader is further configured to induce the first magnetic field produced by an induction coil of the first one of the plurality of magnetic field producing elements incorporated into the object.

5. The magnetic reader of claim 4, wherein the one or more characteristics of the first magnetic field comprise a decay time of the first magnetic field produced by the first one of the plurality of magnetic field producing elements incorporated into the object.

6. The magnetic reader of claim 4, wherein the first one of the plurality of magnetic field producing elements comprising a magnetic coil, and wherein the hardware processor of the magnetic reader is further configured to induce the first magnetic field using the magnetic coil incorporated into the object.

7. The magnetic reader of claim 1, wherein the first one of the plurality of magnetic field producing elements incorporated into the object comprise one or more permanent magnets.

8. The magnetic reader of claim 1, wherein the first one of the plurality of magnetic field producing elements incorporated into the object comprises one or more capacitors.

9. The magnetic reader of claim 1, wherein the first one of the plurality of magnetic field producing elements incorporated into the object comprises one or more induction coils.

10. The magnetic reader of claim 1, wherein the magnetic field detector comprises one or more magnetometers.

11. A method for use by a magnetic reader for identifying an object, the magnetic reader including a hardware processor, a memory, and a magnetic field detector, the memory storing a plurality of magnetic field profiles having magnetic characteristics of a plurality of magnetic field producing elements designed for incorporation into a plurality of objects including the object, the method comprising:
    detecting, using the hardware processor and the magnetic field detector, a first magnetic field produced by a first one of the plurality of magnetic field producing elements incorporated into the object;
    measuring, using the hardware processor and the magnetic field detector, one or more characteristics of the first magnetic field produced by the first one of the plurality of magnetic field producing elements;
    comparing, using the hardware processor, the one or more characteristics of the first magnetic field to one or more of the plurality of magnetic field profiles stored in the memory to match the first magnetic field with the magnetic characteristics of the first one of the plurality of magnetic field producing elements; and
    identifying the object, using the hardware processor, based on the comparison and matching the first magnetic field with the magnetic characteristics of the first one of the plurality of magnetic field producing elements.

12. The method of claim 11, wherein the one or more characteristics of the first magnetic field comprise a field strength of the first magnetic field produced by the first one of the plurality of magnetic field producing elements incorporated into the object.

13. The method of claim 11, wherein the one or more characteristics of the first magnetic field comprise a shape of the first magnetic field produced by the first one of the plurality of magnetic field producing elements incorporated into the object.

14. The method of claim 11, further comprising inducing, using the hardware processor of the magnetic reader, the first magnetic field produced by an induction coil of the first one of the plurality of magnetic field producing elements incorporated into the object.

15. The method of claim 14, wherein the one or more characteristics of the first magnetic field comprise a decay time of the first magnetic field produced by the first one of the plurality of magnetic field producing elements incorporated into the object.

16. The method of claim 11, wherein the first one of the plurality of magnetic field producing elements comprising a magnetic coil, and wherein the method further comprises inducing, using the hardware processor of the magnetic reader, the first magnetic field using the magnetic coil incorporated into the object.

17. The method of claim 11, wherein the first one of the plurality of magnetic field producing elements incorporated into the object comprise one or more permanent magnets.

18. The method of claim 11, wherein the first one of the plurality of magnetic field producing elements incorporated into the object comprises one or more capacitors.

19. The method of claim 11, wherein the first one of the plurality of magnetic field producing elements incorporated into the object comprises one or more induction coils.

20. The method of claim 1, wherein the magnetic field detector comprises one or more magnetometers.

* * * * *

UNITED STATES PATENT AND TRADEMARK OFFICE
CERTIFICATE OF CORRECTION

PATENT NO. : 9,934,413 B2
APPLICATION NO. : 15/225644
DATED : April 3, 2018
INVENTOR(S) : Bassett Page 1 of 1

It is certified that error appears in the above-identified patent and that said Letters Patent is hereby corrected as shown below:

In the Claims

Column 9, Line 19, "claim 1," should read --claim 11,--

Signed and Sealed this
Twenty-fifth Day of June, 2019

Andrei Iancu
*Director of the United States Patent and Trademark Office*